United States Patent
Riddle, Jr. et al.

(10) Patent No.: US 6,793,208 B1
(45) Date of Patent: Sep. 21, 2004

(54) TOOL SYSTEM FOR REPAIRING EYEGLASSES

(76) Inventors: Charles W. Riddle, Jr., 1422 Bluegrass Rd., Nolensville, TN (US) 37135; Robert A. Riddle, 10699 Northview Dr., Dexter, MO (US) 63841

( * ) Notice: Subject to any disclaimer, the term of this patent is extended or adjusted under 35 U.S.C. 154(b) by 68 days.

(21) Appl. No.: 10/010,349

(22) Filed: Nov. 9, 2001

(51) Int. Cl.⁷ ................................................ B25B 1/00
(52) U.S. Cl. .................................. 269/3; 269/6; 29/278
(58) Field of Search ......................... 269/3, 6, 95–96, 269/143, 278, 268, 223

(56) References Cited

U.S. PATENT DOCUMENTS

| | | | |
|---|---|---|---|
| 1,412,519 A | | 4/1922 | Hansen |
| 1,420,988 A | | 6/1922 | Foehl |
| 1,428,029 A | | 9/1922 | Hansen |
| 1,439,664 A | | 12/1922 | Foehl |
| 1,450,959 A | | 4/1923 | Lawlor |
| 1,746,016 A | * | 2/1930 | Shiffman et al. ............ 29/807 |
| 1,916,024 A | * | 6/1933 | Simon .......................... 29/807 |
| 2,564,752 A | | 8/1951 | Collins |
| 2,615,356 A | | 10/1952 | Greco |
| 2,635,238 A | * | 4/1953 | Garland ...................... 606/142 |
| 3,017,692 A | * | 1/1962 | Burnell ........................ 29/229 |
| 4,834,352 A | * | 5/1989 | Thornton ...................... 269/6 |
| 4,993,286 A | | 2/1991 | Shaw |
| 5,765,820 A | * | 6/1998 | Marusiak ...................... 269/6 |
| 5,775,678 A | | 7/1998 | Ferland |

OTHER PUBLICATIONS

Sadler Optical Tools and Findings 2001/2002, 9/01, pp. 1 and 23, vol. 138, USA.
New York Trade Show, Sadler Hinge Doctor, Feb. 2000.

* cited by examiner

*Primary Examiner*—Lee D. Wilson
(74) *Attorney, Agent, or Firm*—Waddey & Patterson, P.C.; Mark J. Patterson; Phillip E. Walker

(57) ABSTRACT

A tool system for inserting temple screws in eyeglass frames includes first and second scissor arms, with each scissor arm having proximal and distal ends, the arms pivotally connected so that the ends can be moved towards and away from one another when the arms are pivotally moved using finger-receiving devices at the distal ends of the scissor arms. A clamp locking mechanism is an extended ratchet device for providing stepwise engagement of the first and second scissor arms in a position where the finger receiving devices are moved closer together and prevented from moving further apart. Clamping and gripping surfaces at the proximal ends of the arms grip the spring hinge eyeglass frames, with an elongated projection extending away from the clamping surface on one arm to engage the eyeglass temples to temporarily secure the spring hinge in a state of extension.

18 Claims, 6 Drawing Sheets

TOOL SYSTEM FOR REPAIRING EYEGLASSES

FIELD OF THE INVENTION

The present invention relates to tools and methods used in the repair of eyeglasses. More particularly, the present invention relates to a clamping tool and system for attaching a spring-hinged temple to eyeglass frame fronts. The tool of the present invention assists in inserting or removing temple screws in eyeglass frames with spring hinge temples.

BACKGROUND OF THE INVENTION

Conventional eyeglasses or spectacles use a frame to support and position a pair of optical lenses in front of the eyes for vision correction. The eyeglass frame will typically include a frame front that rests on the bridge of the nose to support the eyeglass lenses, and left and right elongate members called temples that extend rearwardly from endpieces on the frame front to provide support for the frame on the ears of the wearer. In many such eyeglass frames, the temples are pivotally attached to the endpieces on the frame front using spring hinges. As discussed in greater detail below, the frame front is attached to the temples using temple screws inserted through a common cylindrical aperture that is created when a temple aperture and frame front aperture are axially aligned. The spring in the spring hinge temple is connected to a movable member that, when the temple is joined with the frame front, shares the common aperture with the endpiece of the frame front.

Because the temple spring is in a tension state, when a temple is detached from the frame front during a repair process, the tension of the spring causes the movable member of the temple to become misaligned with the center line of the aperture. This makes it more difficult to manually position and insert the temple screws for reassembly. Accordingly, the movable member of the spring hinge temple must be temporarily clamped in an extended position in order to achieve accurate axial alignment between the temple aperture and the frame front aperture.

U.S. Pat. No. 5,775,678, issued to Serge Ferland, on Jul. 7, 1998, incorporated herein by reference in its entirety, discloses an eyeglass repair tool used to clamp the spring hinge moveable member in its extended position by utilizing a wire as the clamping device. This device is inherently less stable and rigid and is a more complex clamping tool. Also, this is not as useful for clamping spring hinge members having recessed openings, as is present in many spring hinge structures.

U.S. Pat. No. 4,993,286 issued to John P. Shaw on Feb. 19, 1991, incorporated herein by reference in its entirety, discloses an eyeglass repair tool used to hold frame fronts and spring hinge temples in place. However, this tool does not retain spring hinge structures in an extended position and thus does not facilitate accurate alignment of the frame front aperture with the temple aperture for achieving easy insertion and extraction of the temple screw.

What is needed, then, is a simplified eyeglass repair tool, system and method that facilitate the attachment of spring hinge temples to eyeglass frame fronts by applying the proper force to overcome the tension of the spring hinge and allowing for easy, accurate alignment of the temple and frame front apertures.

SUMMARY OF THE INVENTION

The present invention relates to a tool, system, and method used for attaching a spring-hinged temple to an eyeglass frame front.

An object of the present invention is to provide a simple multi-faceted hand tool to facilitate the attachment of spring hinge temples to eyeglasses frame fronts. The tool of the present invention allows a user to apply the proper pressure to overcome the tension of the spring hinge in the extended position, thus allowing for accurate axial alignment of the apertures defined by the temple and the frame front along a center line, for easy insertion of the temple screw.

Another object of the present invention is to provide a method of attaching a spring-hinged temple to eyeglass frame fronts using a simple, hand-operated tool.

Furthermore, the present invention relates to a clamping tool having first and second arms. The first and second arms are pivotally connected at a pivot point located between proximal and distal ends of the arms. Finger receptacles are integrally attached to the distal ends of the arms for communicating manual force through the first and second arms. The proximal end of the first arm has a clamping surface with an upwardly extending projection shaped to engage a spring hinge eyeglass temple. A gripping surface is integrally formed at the proximal end of the second arm opposing the clamping surface. The first and second arms are provided with a clamp locking mechanism. In one embodiment, the clamp locking mechanism provides stepwise engagement of the first and second arms from an unclamped position in which the distal ends are spaced apart to a clamped position in which the distal ends are brought closer together. The clamp locking mechanism also prevents movement in an opposite direction. That is, the arms close in scissor-like fashion.

In another embodiment of the present invention, a tool for inserting temple screws in eyeglass frames having spring hinge temples includes first and second scissor arms, with each scissor arm having proximal and distal ends, the arms pivotally connected so that the ends can be moved towards and away from one another when the arms are pivotally moved. The tool of this embodiment further includes finger-receiving devices at the distal ends of the scissor arms for communicating manual force to pivotally move the scissor arm ends in scissors-like fashion. The clamp locking mechanism is an extended ratchet device for providing stepwise engagement of the first and second scissor arms in a position where the finger receiving devices are moved closer together and prevented from moving further apart. Clamping and griping surfaces at the proximal ends of the arms provide a means to grip spring hinge eyeglass frames, with an elongated projection extending away from the clamping surface on one arm to engage the eyeglass temples to temporarily secure the spring hinge in a state of extension.

Another embodiment of the present invention is a method of attaching a spring-hinged temple to an eyeglass frame front, the temple having an internal spring attached to a movable member defining a temple aperture, the frame front having a frame front aperture, the temple and frame front apertures defining a common aperture for receiving a temple screw when the temple and frame front apertures are placed in a position of accurate axial alignment. The method includes manipulating the temple and frame front to obtain partial axial alignment of the temple and frame front apertures and then inserting a positioning needle through the temple aperture and frame front aperture to temporarily maintain the partial axial alignment. The spring is then placed under tension by rotating the temple about the positioning needle into an extended position. A clamping tool is attached to the movable member to temporarily maintain the temple in the extended position. The positioning needle is then removed and the temple and frame front apertures are moved into accurate axial alignment to define the common aperture. The temple screw is inserted into the common aperture and the clamping tool is disengaged.

In a preferred embodiment of the present invention, the portion of the temple to be clamped is moved into a proper clamping relationship with the clamping surface, which has at least one of a cone or blade projection that will accommodate the vast majority of spring hinge temples. The projection is securely held in position against the temple by the opposing arm or jaw. The locking tension against the temple is achieved through the multi-ratcheting adjustment of the clamp locking mechanism. Simplicity and function attribute to the easy application of the tool allowing only one hand to hold the frame and the attached tool while the other hand is free to insert or extract the temple screw.

DETAILED DESCRIPTION OF THE PREFERRED EMBODIMENTS

Figure 1:
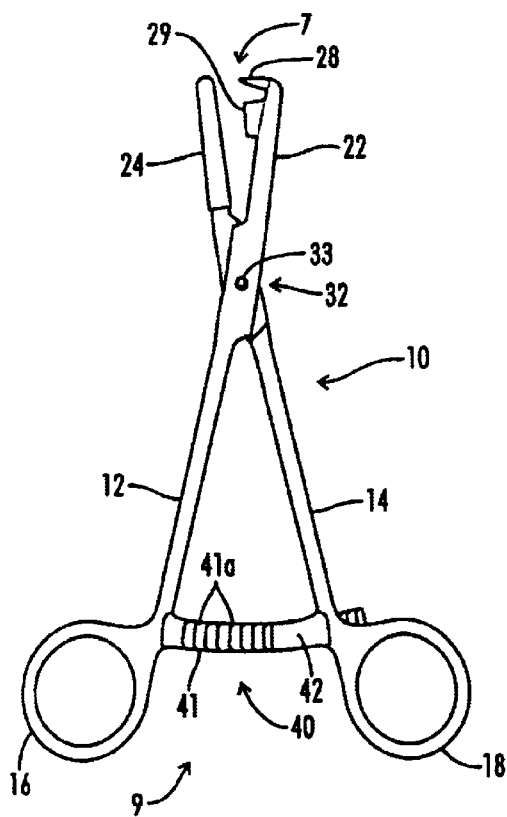
FIG. 1 is a front view of the clamping tool of the present invention.
Figure 2:
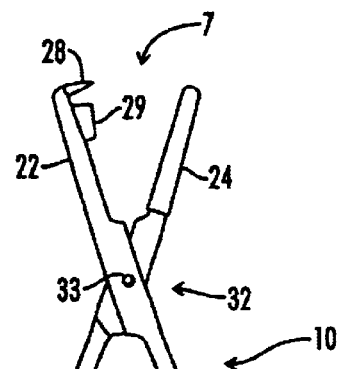
FIG. 2 is a back view of the clamping tool of the present invention.

Referring to the drawings more particularly by reference character, 10 refers to an embodiment of the clamping tool in accordance with the present invention. As shown in FIGS. 1 and 2, the clamping tool 10 is constructed from a first arm 12 and a second arm 14. The first and second arms 12 and 14 each have proximal and distal ends 7 and 9 and are pivotally connected at an intermediate pivot point 32. The clamping tool 10 further includes finger receptacles 16, 18 integrally formed or attached at the distal ends 9 of the arms 12, 14 for communicating manual force to the first and second arms 12 and 14. Preferably, the finger receptacles 16, 18 are finger loops. However, the finger receptacle is not known to be critical and may be a curved or straight handle.

At the proximal end 7 of the first arm 12 is a jaw-like clamping surface 22. The proximal end 7 of the second arm 14 is formed into a jaw-like gripping surface 24. The clamping surface 22 includes first and second upwardly extending projections 28 and 29 that are, positioned and shaped to receive and engage corresponding first and second types of spring-hinged eyeglass temples. In a preferred embodiment, the first projection 28 may have a shape of an inverted cone and the second projection 29 may have a shape of a blade or elongated triangle. However, the shape of the projections may vary depending on the geometry and configuration of the temples on which work is to be performed. Thus, the projection or projections may have any shape that conforms to the object of the invention and securely holds the temple hinge spring in an extended position as discussed below and as shown in the drawings.

Figure 11:
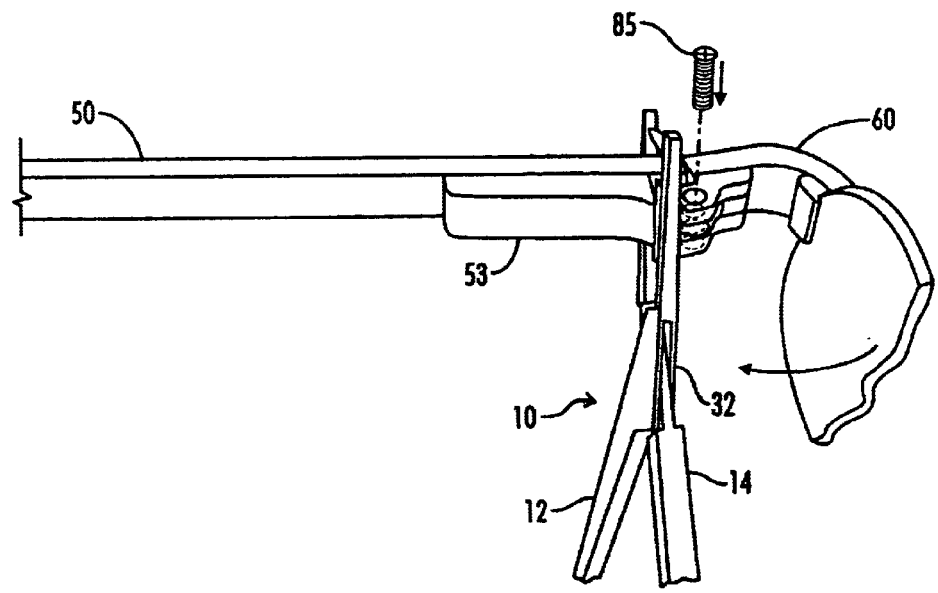
FIG. 11 shows the placement of the temple screw into the common aperture after accurate alignment of the temple and frame front apertures in accordance with the method of the present invention.
Figure 12:
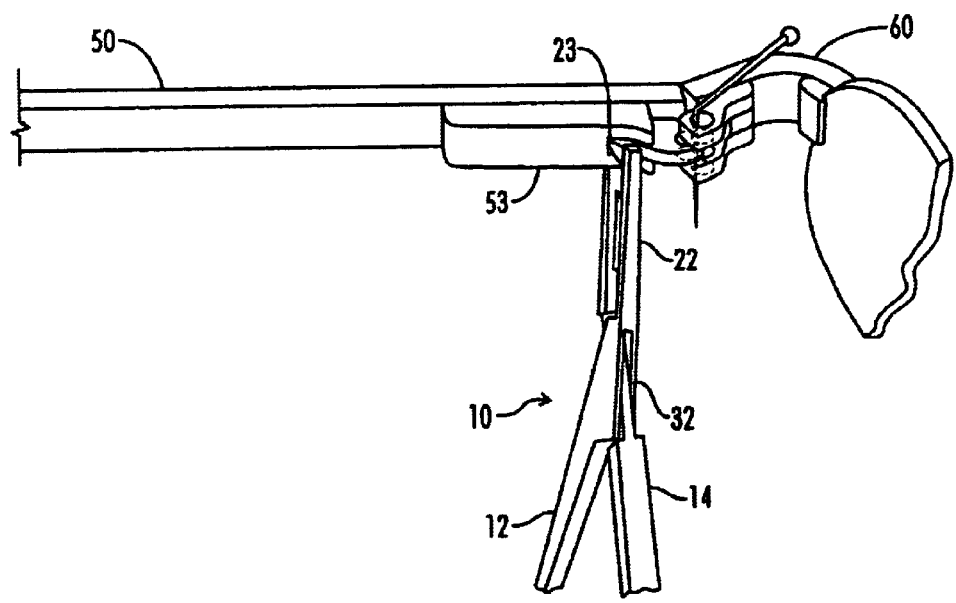
FIG. 12 shows a clamping tool using an inverted cone projection to clamp a second type of spring-hinged eyeglass temple in the extended position in accordance with the method of the present invention, prior to accurate alignment of the temple and frame front apertures.

The preferred embodiment as shown includes two projections 28 and 29 so that a single clamping tool 10 can be used to work with temples 50 of two different types as shown in FIGS. 11 and 12. However, a tool 10 can be provided with only one projection and a tool system in accordance with this invention can include two tools 10, each having a single projection but corresponding to two different types of temples. Also, it may be desirable to fabricate the projections 28 and 29 so that they can be removably attached to the clamping surface 22 by mounting the projections on a hollow base portion (not shown) and then sliding the base portion over the proximal end of the first arm 12. Thus, a tool kit in accordance with this invention can include the clamping tool 10 (such as a 5.0 or 5.5 inch hemostat) and removable projections 28 and 29 that can be attached as needed.

In a preferred embodiment, the tip of the cone (first projection 28 on FIG. 4) contacts the gripping surface 24 when the arms are closed. The angle of the top edge of the blade (second projection 29 on FIG. 4) is designed such that the blade edge will be parallel to the gripping surface 24 when the arms 12, 14 are opened to accommodate a medium spring hinge lateral thickness, for example, when the blade edge is positioned approximately 5 mm from the gripping surface 24. Also, the longitudinal spacing between the first and second projections 28 and 29 must be selected to prevent marring of the temple 50 by the projection (cone or the blade) that is not applying a clamping action on the temple.

Opposite the clamping surface 22 on the first arm 12 is the gripping surface 24 on second arm 14. The gripping surface 24 receives the pressure applied to the temple by the clamping surface 22, thereby applying a jaw-like clamping force to the temple 50. The exact configuration of the gripping surface 24 is not known to be critical, and it is preferably made of, or coated with, a material that will resist marring the temple while clamping it. In one embodiment, the gripping surface 24 has a serrated surface 27 to provide better adhesion properties for a polymeric coating.

Preferably, the pivot point 32 is fabricated in a conventional "box lock" or scissor design utilizing a pin, screw, or the like (33 on FIG. 1) to pivotally connect the first arm 12 and second arm 14. However, the exact design of the pivot point 32 is not critical as long as it adequately provides support for the pivoting of the first and second arms 12 and 14.

The clamping tool 10 of the present invention includes a clamp locking mechanism that can lock the first and second arms 12, 14 in a clamping position, and provides a variable or stepwise engagement of the first and second arms 12, 14 from an unclamped position in which the distal ends 9 of the arms 12, 14 are spaced apart to a clamped position in which the distal ends 9 are brought closer together, while preventing movement in an opposite direction. Preferably, the clamping movement is scissors-like. Most preferably, the clamp locking mechanism is a ratchet arc 40. In one embodiment, the ratchet arc 40 may comprise a ratchet arm 41 with teeth 41a. A ratchet cog 42 is oriented to cooperate with the surface of the corresponding teeth 41a, and engage the teeth 41a so as to prevent the first and second arms 12 and 14 from separating until such time as an operator applies a twisting movement in order to lift the ratchet teeth 41a away from the ratchet cog 42. Thus, the ratchet arc 40 assists in stabilizing the clamping tool 10 of the present invention while engaged with a temple. Different clamp locking mechanisms can be used, with the only requirement being that the clamp locking mechanism does not allow the first and second arms 12, 14 to slip while the clamping tool 10 is engaged with a temple 50.

The clamping tool 10 as shown in FIG. 1 has closed the separation between the first and second arms 12, 14 while FIG. 2 shows the arms in a more open position. The ratchet cog 42 in FIG. 2 is not yet engaged to ratchet arm 40.

Figure 3:
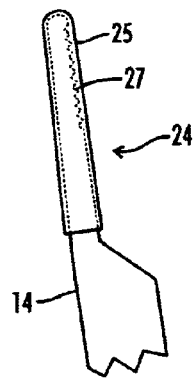
FIG. 3 is an enlarged front view of the proximal end of one of the scissor arms of the clamping tool, showing the gripping surface.

FIG. 3 shows an enlarged view of a gripping surface 24 of a second arm 14. In this embodiment, the gripping surface 24 includes a polymeric coating 25 on a serrated surface 27.

Figure 4:
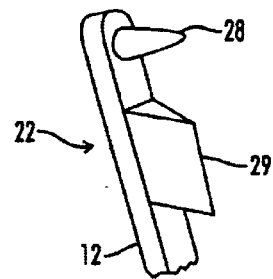
FIG. 4 is an enlarged oblique view of the proximal end of one of the scissor arms of the clamping tool, showing the clamping surface comprising a first projection shaped as an inverted cone and a second, elongated triangular blade projection.

FIG. 4 shows an enlarged view of clamping surface 22 of a first arm 12. The first projection 28 is an inverted cone and the second projection 29 is an elongated triangular blade. The positions of the cone or blade can be modified as needed, or may be interchanged, as long as suitable spacing is maintained to prevent interference and marring by one projection when the other projection is used to engage a temple.

Figure 5:
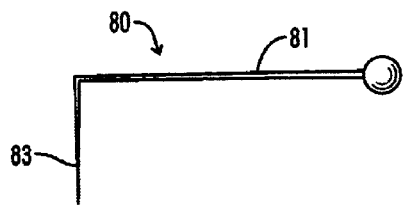
FIG. 5 is a side a view of a positioning needle of the present invention.

In one embodiment of the invention, a tool system or kit for repair of eyeglass frames will include a positioning needle 80 as shown in FIG. 5. Preferably, the needle 80 will include a handle portion 81 used for manipulation of the needle, and an insertion portion 83 extending at right angles from handle portion 81.

Figure 6:
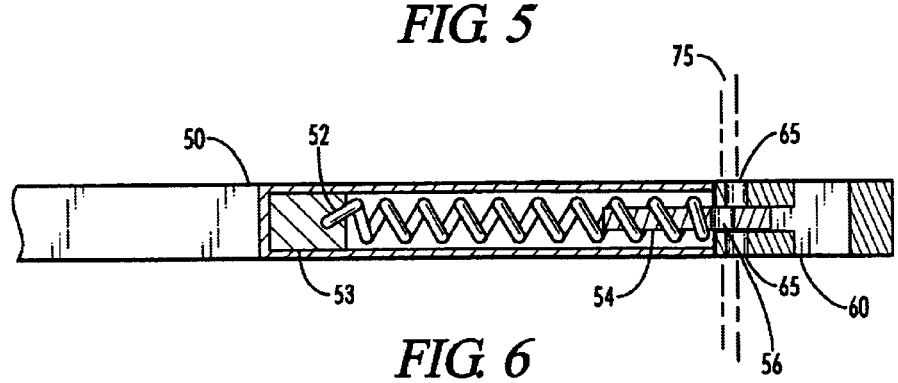
FIG. 6 is an enlarged cross section view of a proximal end of a conventional spring hinge eyeglass temple illustrating misaligned apertures with the endpiece of an eyeglass frame front.

The invention also includes a method for attaching a spring-hinged temple to eyeglass frame fronts using a clamping tool. A typical spring-hinged temple 50 is partially shown in FIG. 6. The temple 50 includes an internal spring 52. The spring 52 is attached to a moveable member 54 in a spring housing 53 that further defines a temple aperture 56. FIG. 6 shows the temple 50 engaged with an eyeglass frame front endpiece 60. The endpiece 60 includes a frame front aperture 65. It can be seen in FIG. 6 that the temple and frame front apertures 56, 65 are partially but not accurately axially aligned. This partially aligned position would be typical of the temple aperture 56 and frame front aperture 65 with the temple and spring hinge 50 in the unextended position.

Figure 7:
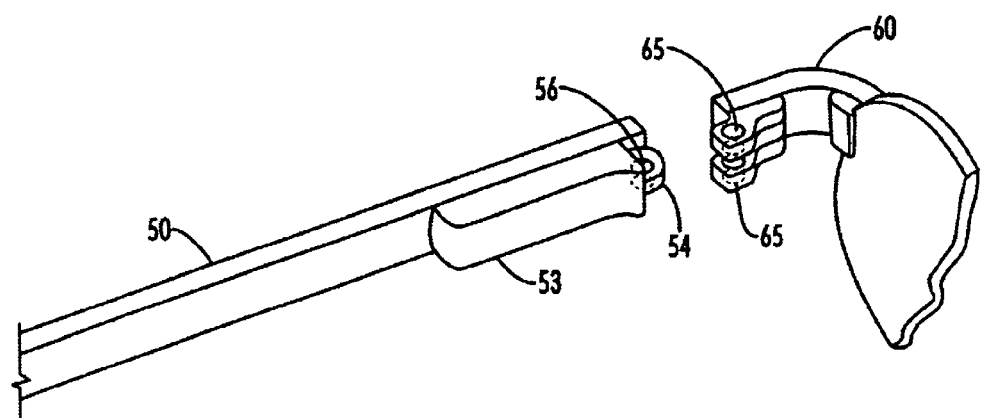
FIG. 7 is an exploded oblique view of a spring-hinged temple and endpiece portion of an eyeglass frame front.
Figure 8:
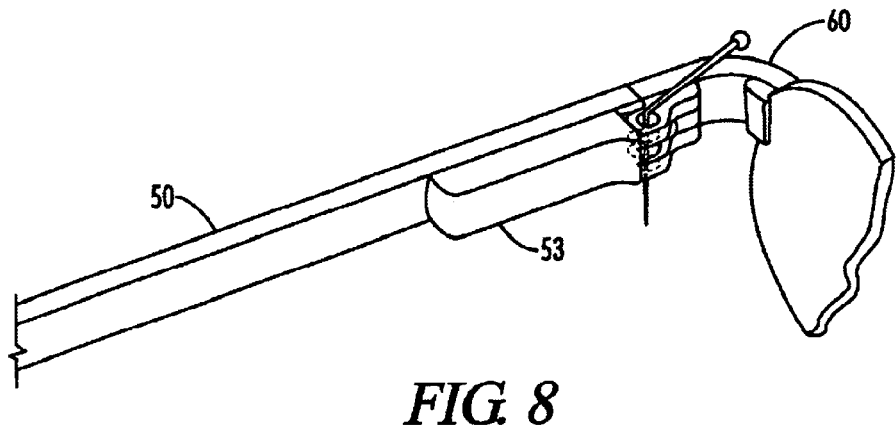
FIG. 8 is an oblique view of a spring-hinged temple and an eyeglass frame front with respective apertures maintained in partial axial alignment by a positioning needle in accordance with the method of the present invention.
Figure 9:
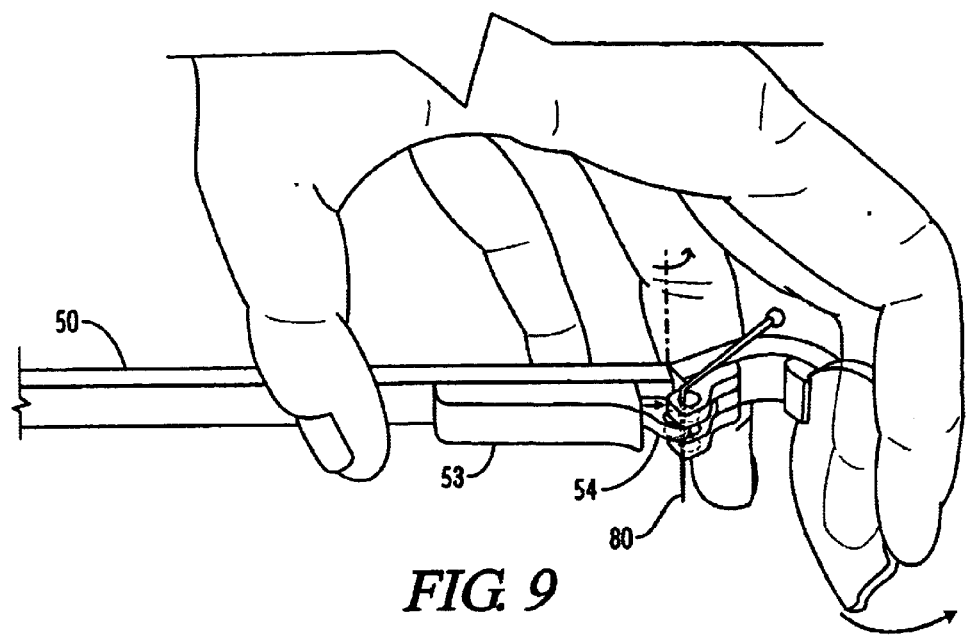
FIG. 9 shows a spring-hinged temple being flexed into an extended position after insertion of a positioning needle in accordance with the method of the present invention.

FIG. 7 shows a temple 50 separated from the eyeglass frame endpiece 60. In accordance with the method of the present invention, the apertures 56 and 65 of the separated temple 50 and frame front endpiece 60 are manually positioned in partial alignment so that the positioning needle 80 can be inserted into the temple and frame front apertures 56, 65. As shown in FIG. 8, the insertion portion 83 of the positioning needle 80 has a diameter and length that, when inserted, the apertures 56, 65 are maintained in partial alignment so that the temple 50 can be moved and clamped into to the extended position as shown in FIG. 9.

Figure 10:
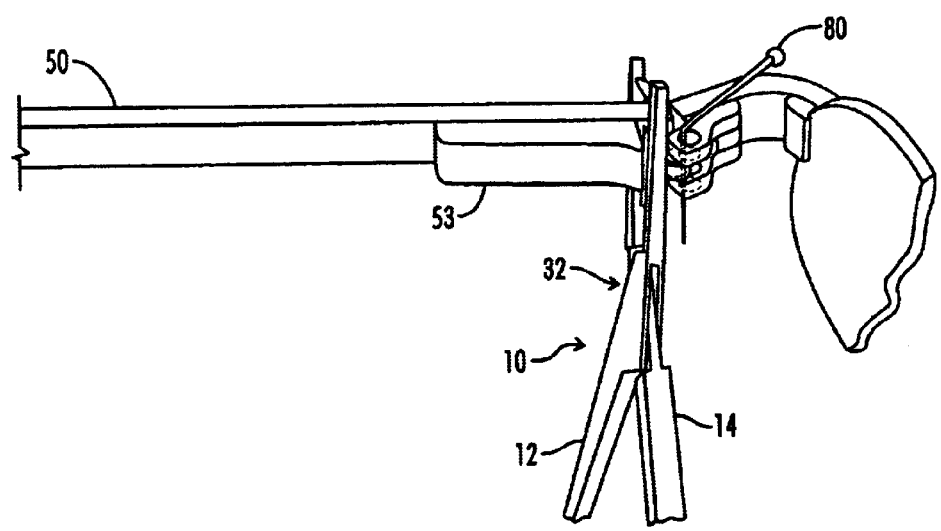
FIG. 10 shows a clamping tool using a blade projection to clamp a first type of spring-hinged eyeglass temple in the extended position in accordance with the method of the present invention, prior to accurate alignment of the temple and frame front apertures.

Upon rotating the temple 50 with respect to the eyeglass frame front, the spring is flexed and the moveable member 54 (FIG. 6) moves away from the spring housing 53. While the temple 50 is in this extended position (see FIG. 9), the appropriate projection (28 or 29) on the clamping surface 22 engages the moveable member 54 such that the moveable member 54 cannot retract back toward the spring housing 53 (see FIG. 10). The tool 10 is then locked in this clamped position to hold the temple 50 in the extended position. The positioning pin 80 may be now removed, with the temple 50 remaining clamped in an extended position. The apertures 56 and 65 can now be manipulated into accurate alignment and a fastening device 85 may be inserted into the common aperture along the centerline (see FIGS. 10–11).

Two popular styles of spring hinge temples are shown in FIGS. 11 and 12. In FIG. 11, a blade like projection is used to engage a first type of temple 50 having a flat, V-shaped, or angled surface. In FIG. 12, the tip of an inverted cone projection engages another type of temple 50 having recesses 23 in the hinge portion. When the clamping tool 10 is provided with both first and second projections 28 and 29, such as a cone and blade, the cone height should be selected so that it will contact the gripping surface 24 when the arms 12, 14 of the tool 10 are closed. The top edge of the blade (second projection 29 on FIG. 4) is preferably angled such that the blade edge will be parallel to the gripping surface 24 when the arms 12, 14 are opened to engage spring hinge having a medium lateral thickness. This reduces the likelihood of mutual interference between operation of the projections.

Figure 13A:
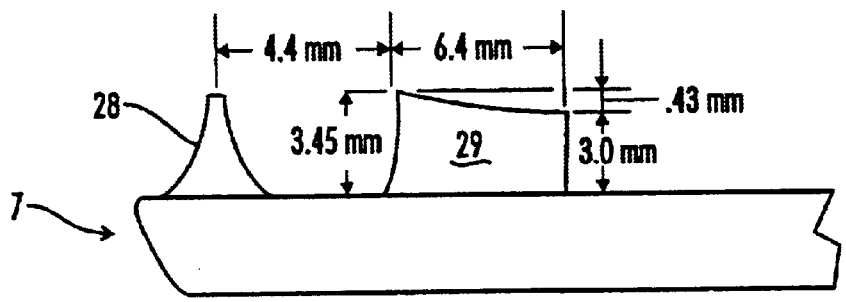
FIG. 13(a) is an enlarged side view of the clamping surface and projections at the proximal end of a scissor arm.
Figure 13B:
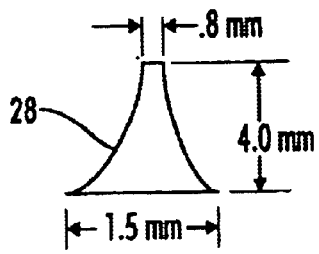
FIG. 13(b) is an enlarged end view of an inverted conical projection as shown in FIG. 13(a).
Figure 13C:
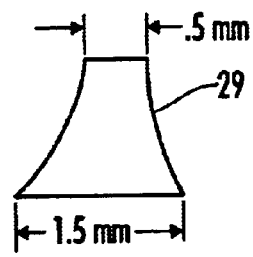
FIG. 13(c) is an enlarged end view of a blade projection as shown in FIG. 13(a).

FIGS. 13(a), (b), and (c) provide a more detailed view, and a preferred embodiment, of the clamping surface 22 and projections 28, 29 shown in FIG. 4. As can be seen, the blade shape of the second projection 29 has a top edge that tapers downwardly from the proximal end of the arm 14. This taper should be configured to allow the blade edge to fully engage with the temple 50 when the clamping tool is clamped and in use as shown in FIG. 11.

In a preferred embodiment as shown in FIGS. 13(a) and (c), the blade projection 29 is approximately 6.4 mm in length and tapers from 3.45 mm in height to 3.0 mm in height. It is approximately 1.5 mm thick at its base and 0.5 mm in thickness at the blade edge. In a preferred embodiment as shown in FIGS. 13(a) and (b), the base of the cone projection 28 is approximately 1.5 mm in thickness with the tip approximately 0.8 mm thick. The tip of the cone is approximately 4.4 mm from the proximal edge of the blade.

The arms of the clamping tool of the present invention are preferably made of stainless steel or the like, although such construction is not critical. The material is preferably corrosion resistant and has a soft elastic range to permit the desired flexibility without permanently deforming. The desired amount of flexibility provides a firm, consistent clamping action along the length of the arms, and allows a user to easily provide a twisting motion, if necessary, to disengage the clamping device.

The invention thus being described, it will be obvious that the same may be varied in many ways. Such variations are not to be regarded as a departure from the spirit and scope of the present invention, and all such modifications as would be obvious to one of ordinary skill in the art are intended to be included within the scope of this invention.

We claim:

1. A tool system for use in the repair of an eyeglass frame having a pair of spring-hinge temples each pivotally joined to a frame front using a temple screw inserted through a common aperture formed when a temple aperture in a proximal end of the temple is axially aligned with a frame front aperture on an edge portion of the frame front, the tool system comprising:
    a first clamping tool having first and second arms, each arm having a proximal and a distal end, the first and second arms pivotally connected at a pivot point between said proximal and distal ends;
    a finger receptacle attached at the distal end of at least one of the arms for communicating manual force to said first and second arms;
    a clamping surface at the proximal end of said first arm;
    a first projection extending away from said clamping surface, said first projection attached at a position along said clamping surface and having a shape to receive and engage a first type of the spring-hinge eyeglass temple;
    a gripping surface at the proximal end of the second arm opposing said clamping surface;
    a clamp locking mechanism for maintaining a clamped positioning of said first and second arms when the distal ends of the arms are brought closer together, while preventing movement in an opposite direction; and
    wherein said first projection comprises an elongated blade.

2. The tool system of claim 1 further comprising a pin to pivotally engage the first and second arms at the pivot point.

3. The tool system of claim 1, further comprising a screw to engage the first and second arms at the pivot point.

4. The tool system of claim 1 wherein the finger receptacle is a finger loop.

5. The tool system of claim 1 wherein said first projection is removably attached to said first arm.

6. The tool system of claim 1 wherein said first projection comprises an inverted cone having a tip sized to extend through recessed openings in the spring hinge.

7. The tool system of claim 1 wherein an upper edge of the blade tapers downwardly from a proximal end of the blade to a distal end of the blade.

8. The tool system of claim 1 further comprising a second projection extending away from said clamping surface proximate the first projection, said second projection attached at a position along said clamping surface and having a shape to receive and engage a second type of the spring-hinge eyeglass temple.

9. The tool system of claim 8 wherein said second projection is removably attached to said first arm.

10. The tool system of claim 8 wherein said first projection comprises an inverted cone and said second projection comprises an elongated blade.

11. The tool system of claim 10 wherein said inverted cone extends away from said clamping surface to a cone height that allows a tip of the cone to contact said gripping surface when said proximal ends of said first and second arms are pivoted towards each other, and wherein said elongated blade extends away from said clamping surface and has an angled blade edge that is parallel to said gripping surface when said blade edge and gripping surface are positioned to clamp a spring hinge temple having a medium lateral thickness.

12. The tool system of claim 1 wherein the clamp locking mechanism provides variable clamping positioning of said first and second arms.

13. The tool system of claim 12 wherein said clamp locking mechanism comprises a ratchet arc.

14. The tool system of claim 13 wherein the ratchet arc comprises a ratchet arm with teeth and a ratchet cog oriented to cooperate with surfaces of corresponding teeth.

15. The tool system of claim 1 further comprising
    a second clamping tool having first and second arms, each arm having a proximal and a distal end, the first and second arms pivotally connected at a pivot point between said proximal and distal ends;
    a finger receptacle attached at the distal end of at least one of the arms for communicating manual force to said first and second arms;
    a clamping surface at the proximal end of said first arm;
    a second projection extending away from said clamping surface, said second projection attached at a position along said clamping surface and having a shape to receive and engage a second type of the spring-hinge eyeglass temple;
    a gripping surface at the proximal end of the second arm opposing said clamping surface; and
    a clamp locking mechanism for providing clamping engagement of said first and second arms from an unclamped position in which the distal ends are spaced apart to a clamped position in which the distal ends are brought closer together, while preventing movement in an opposite direction.

16. A tool system for use in the repair of an eyeglass frame having a pair of spring-hinge templates each pivotally joined to a frame front using a temple screw inserted through a common aperture formed when a temple aperture in a proximal end of the temple is axially aligned with a frame front aperture on an edge portion of the frame front, the tool system comprising:
    a first clamping tool having first and second arms, each arm having a proximal and a distal end, the first and second arms pivotally connected at a pivot point between said proximal and distal ends;
    a finger receptacle attached at the distal end of at least one of the arms for communication manual force to said first and second arms;
    a clamping surface at the proximal end of said first arm;
    a first projection extending away from said clamping surface, said first projection attached it a position along said clamping surface and having a shape to receive and engage a first type of the spring-hinge eyeglass temple;
    a gripping surface at the proximal end of the second arm opposing said clamping surface;
    a clamp locking mechanism for maintaining a clamped positioning of said first and second arms when the distal ends of the arms are brought closer together, while preventing movement in an opposite direction; and
    a positioning needle having a diameter and length adapted for insertion through the common aperture when the temple aperture and frame front aperture are moved into partial axial alignment.

17. The tool system of claim 16 wherein the positioning needle has a right angle handle section.

18. A tool for facilitating removal and insertion of a temple screw in an eyeglass frame having a spring hinge temple, the spring hinge temple including a movable member with a surface that is exposed by pivoting the temple into an extended position, the tool comprising:

first and second scissor arms pivotally connected and each having proximal and distal ends which can be moved towards and away from one another when the arms are pivotally moved;

means on the scissor arm distal ends for communicating manual force to pivotally move the scissor arm proximal ends;

a blade projection at the proximal end of the first scissor arm, the projection extending inwardly and generally toward the proximal end of the second scissor arm, the projection positioned and shaped to contact the exposed surface of the temple movable member;

a gripping surface at the proximal end of the second scissor arm, the gripping surface positioned and adapted to contact the temple opposite the blade projection to clamp the temple into the extended position:

wherein the blade projection has a blade edge extending from a proximal end to a distal end, the proximal end of the edge being closer to the proximal end of the second scissor arm relative to the distal end of the edge, a protective material attached to the gripping surface to prevent cosmetic damage to the temple; and a positioning pin for temporarily joining the temple to the frame during replacement of a temple screw.

* * * * *